July 4, 1933.  E. F. BACON ET AL  1,916,188
HYDROSTATIC FUEL GAUGE
Filed March 28, 1928
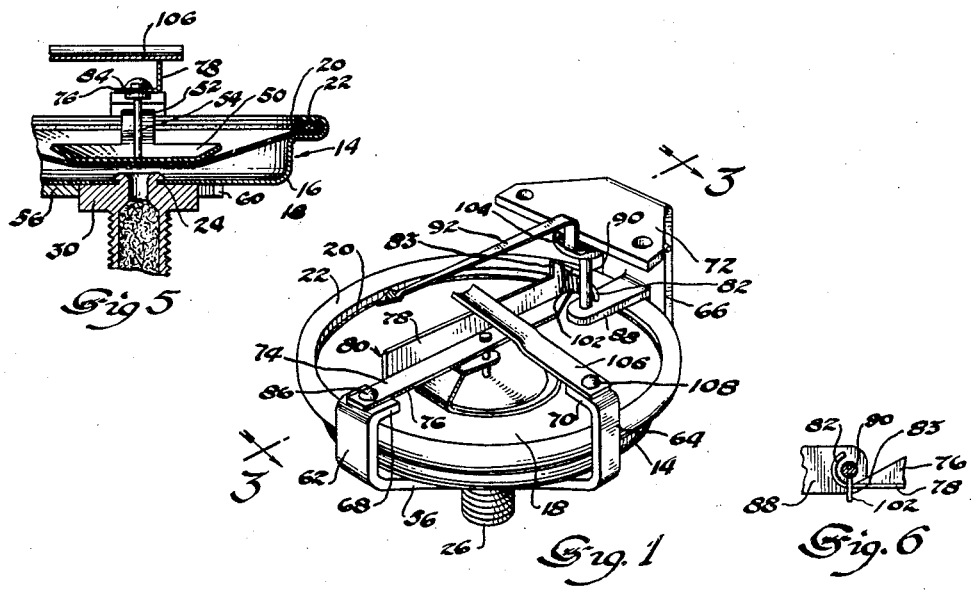
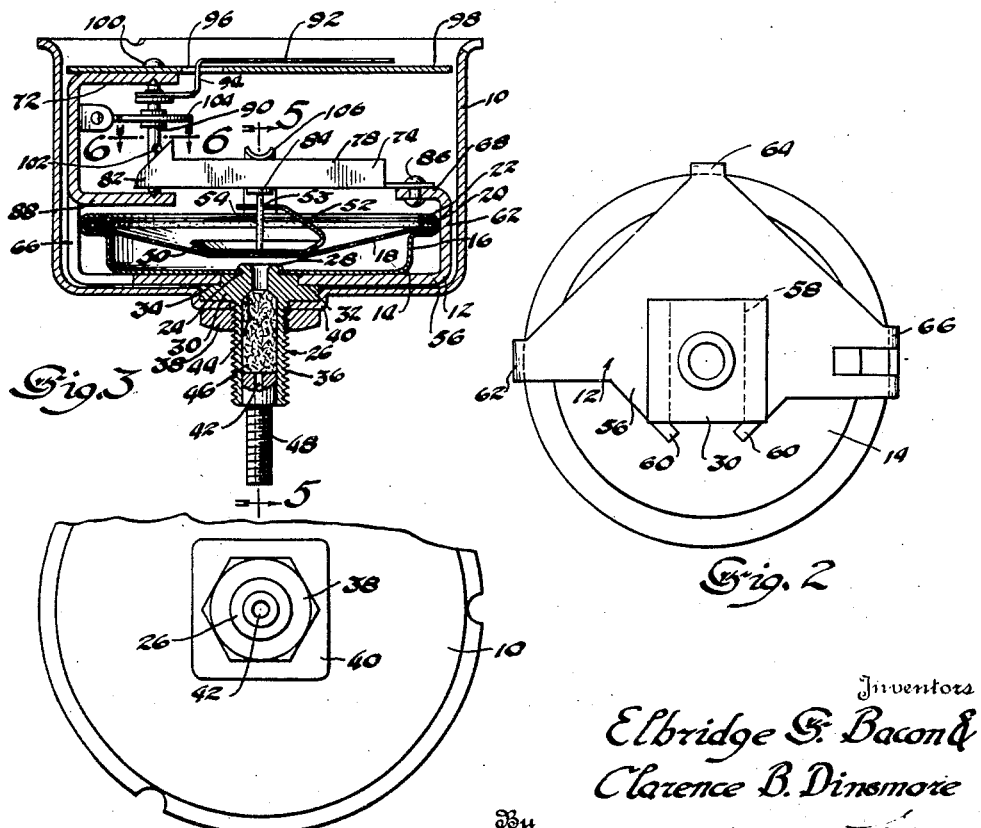
Inventors
Elbridge F. Bacon &
Clarence B. Dinsmore
By Blackmore, Spencer & Flint
Attorneys Patented July 4, 1933

1,916,188

UNITED STATES PATENT OFFICE

ELBRIDGE F. BACON AND CLARENCE B. DINSMORE, OF FLINT, MICHIGAN, ASSIGNORS TO A C SPARK PLUG COMPANY, OF FLINT, MICHIGAN, A COMPANY OF MICHIGAN

HYDROSTATIC FUEL GAUGE

Application filed March 28, 1928. Serial No. 265,406.

This invention relates to gauges and has particular reference to a gauge for use in connection with hydrostatic liquid level systems.

A gauge of the present invention is particularly intended for application to the instrument board or to the fuel container of an automotive vehicle for the purpose of determining the level of the fuel in the gasoline tank. The gauge of the invention, however, is conformable or adaptable to a variety of uses other than the one mentioned.

When the gauge is applied at the instrument board a suitable conduit in the form of a pipe leads from the gauge to the gas tank and extends to the bottom thereof, the pipe terminus in the tank being bell-shaped and slightly spaced from the bottom. The pipe is filled with a gas, preferably atmospheric air, and as the liquid in the gas tank exerts its pressure in the pipe line, this pressure will be transmitted to the instrument board and the gauge will suitably register the fuel liquid level.

The invention has for its object a number of improvements in the calibration of the gauge and in the mechanism itself with a view to constructing a gauge which is extremely accurate, capable of easy calibration, and relatively smaller than gauges of this type which have customarily been used.

The gauge is of the diaphragm type and in order to accomplish the object of the invention the diaphragm is separately mounted in a cup-shaped member, which forms a part of a unit mounted in depression in a base frame and secured without the use of screws, rivets, etc. The base frame has a plurality of projecting fingers having bent ends and onto these ends the various levers and operating mechanism of the gauge are attached. The axis of the diaphragm is axially positioned in the gauge casing and frame and has extending thereover a lever preferably in the form of a phosphor bronze spring, which is interconnected with the diaphragm by means of a suitable pin so that the motion of the diaphragm will be transmitted to the lever. This lever has a cam portion at one end which operates on a pin fixed to a pivoted shaft on which a suitably arranged pointer is mounted.

To another finger on the base member there is secured a spring arm or second lever, preferably a phosphor bronze spring, having a rounded surface which contacts with the edge of the first mentioned lever, and serves as a calibrating means.

The air inlet to the diaphragm is provided with a felt plug the function of which is to dampen sudden surges in pressure in the system.

On the accompanying drawing:

Figure 1 is a perspective view of the gauge mechanism, the outer casing being removed.

Figure 2 is a bottom plan view of the gauge mechanism with the casing removed.

Figure 3 is a section through the gauge mechanism and the casing taken on the line 3—3 of Figure 1.

Figure 4 is a view similar to Figure 2, but with the casing applied.

Figure 5 is an enlarged sectional detailed view of the diaphragm and its interrelated parts, the section being taken substantially on the line 5—5 of Figure 3, the casing being omitted.

Figure 6 is a detailed view of the cam end of one of the levers taken substantially on the line 6—6 of Figure 3.

Referring to the numbered parts on the drawing, the numeral 10 indicates the gauge casing as a whole, 12 the supporting frame member upon which the mechanism is mounted, and 14 the diaphragm unit.

The diaphragm unit comprises the cup-shaped member 16 having secured therein the flexible diaphragm 18, preferably of impregnated cloth, held to the cup by means of the washer 20 and the crimped edge 22. The cup shaped member 16 has an opening 24 at its mid portion, and in this opening there is secured the connector indicated as a whole at 26 and which forms a part of the diaphragm unit. The connector 26 and cup 16 constitutes a frame to support the diaphragm. This connector has a reduced portion at its diaphragm end which is burred over as shown at 28 to secure it to the mid portion of the cup 16. The upper portion of the connector comprises the squared portion 30 having at two sides the rabbets 32 and 34 which with the base of the cup 16 form a pair of slots, the purpose of which will later be described. The lower portion of the connector 26 comprises the threaded portion 36 which receives the nut 38 to rigidly clamp between it and the squared portion 30 the recessed portion 40 of the casing 10. This recessed portion 40 is adapted to receive the lower end of the squared portion 30 of the connector 26 as shown in Figure 3.

The connector 26 has a bore 42, a portion of which is conical as shown at 44 and in this bore there is received a relatively loose and coarse fibrous felt packing 46, which is capable of allowing air to pass therethrough to act on the diaphragm, but which will dampen out any sudden surges of pressure. As the air passes through the bore 42 relatively slow, the packing 46 will not interfere with the efficiency of the gauge. If desired, this packing may be omitted.

A suitable plug 48 may be fitted in the end of the threaded portion 36. This plug 48 may be bored and may serve as a connecting means for the pipe of the liquid level indicating system, although the threaded portion 36 is adaptable to act as a connecting means as well.

Resting on the mid portion of the diaphragm 18 is a cup-shaped disc like member 50, which has an integral bent arm 52 having an opening 53 for the reception of the shank portion of a pin 54 which rests on but is not secured to the disc 50 and the purpose of which will be later described. The arm 52, which may be separately constructed, extends over past the center of the disc 50 and the opening 53 therein conforms substantially to the disc center. The cup-shaped portion 50 may or may not as desired be secured to the diaphragm.

The supporting frame member 12 has its base portion 56 resting on squared portion 30 near the bottom of the casing. This base portion 56 is provided with a slot 58, shown in dotted outline in Figure 2 and over the walls defined by the slot there is adapted to slide the rabbeted portion of the squared end 30 of the connector 26. When the squared portion has been slid into place the projecting tongues 60 at the sides of the slot 58 may be bent over as shown in Figure 2 rigidly to hold the diaphragm unit in position. If desired, the sides of the slot 58 may be left straight and when the diaphragm unit has been slid into place, the parts may be wedged together in a suitable way or solder may be applied to rigidly hold the parts together. It is therefore to be noted that the walls of the slot 58 and rabbets 32, 34, in cooperation with the nut 38, are the sole means for securing the frame 12 in place, no screws, rivets, etc., being used.

The supporting frame 12 has its base 56 of generally triangular formation, as is seen in Figure 2, and at the apices of this triangle the fingers 62, 64 and 66 are provided. These fingers have bent ends 68, 70 and 72 for the purpose of affording a securing means for the various parts of the gauge mechanism. The finger end 72, it is to be noted, is somewhat broader and positioned higher than the finger ends 68 and 70.

From an inspection of Figures 1 and 2, it will be noted that the fingers 62, 64 and 66 are positioned substantially 90° apart, although this particular spacing is not necessary as any suitably angular interrelation may be used. Likewise the supporting frame instead of being triangular, may be square, round or of any other suitable shape.

Riveted rigidly to the end 68 of the finger 62 is a relatively thin lever 74 in the form of a phosphor bronze spring, and which has a shape as is best shown in Figure 1. The lever 74 has a flat base portion 76 and a flat preferably right angularly extending portion 78. The portion 78 extends short of one end, as shown at 80 to allow for ready bending and at its other end the lever is curved as is best seen in Figure 6, and has its curved end in the form of a cam 82. This cam has an extension 83 which projects beyond the edge of the portion 78 in order to give a longer cam surface. A stop or stops may, if desired, be provided on the cam surface to limit the throw of the pin 102 operated thereby.

To the lower portion of the lever 74 there is secured the head 84 of the bolt 54 as is seen in Figures 3 and 5. It will, therefore, be seen that as the diaphragm 18 flexes, and moves the pin 54 in an upward direction when referring to Figure 3, it will bend the lever 74 to cause the cam end 82 to rise. The opposite end, which is secured by means of a rivet 86 to the finger 62, will be held stationary, but the lever will flex between the rivet 86 and the end 80.

The finger 66 of the supporting frame 12 has an extra inwardly bent portion 88 extending parallel to the bent end 72 and between these two bent portions 72 and 88 there is pivotally mounted the shaft 90. The pivotal axis of the shaft is substantially at the center of the curved cam end 82 of the lever 74 when it is in its horizontal position shown in Figure 3. The cam end of the lever 74 it will be understood extends between the end 72 and the bent portion 88 of the finger 66.

Secured to the shaft 90 at its upper end is a pointer 92, which is suitably bent as at 94 and projects through a slot 96 in a dial 98 secured by means of screws or rivets 100 to the broadened bent end 72 of the finger 66. Likewise secured to the shaft 90 is a transversely extending pin 102 which is adapted to contact with the cam surface of the curved end of the lever 74. Secured to the finger 66 between the bent ends 72 and 88 is one end of a hairspring 104, the opposite end of which is secured to the shaft 90. The function of this spring is to always keep the pin 102 in contact with the cam end 82 and to return the pointer 92 to its zero position.

Secured to the bent end 70 of the third finger 64 of the base 56 is a spring arm or lever 106 tightly but pivotally fastened by means of a screw or rivet 108. The connection 108 is fairly tight or rigid, but will allow for the swinging movement of the arm 106, which is preferably a phosphor bronze spring. The arm 106 it will be noted is flattened at its secured end while its free end has a rounded or circular under surface which contacts with but is not secured to the edge of the upwardly bent portion 78 of the lever 74. The spring arm or lever 106 exerts a downward force on the lever 74 and the function of this spring 106 is to accurately calibrate the gauge. By swinging the arm 106 on its pivot 108 to either end of the spring lever 74, the tension exerted by the spring arm 106 on the lever 74 will be greater or less due to the fact that spring force is placed at a greater or less distance from the fulcrum 86 of the lever 74. The rounded surface of the arm 106 is to secure a minimum or point contact between the two levers 74 and 106 and to avoid a broad contact.

The operation of the device is as follows: The threaded portion 36 may be directly connected to the gas pressure line from the fluid container, and as the liquid in the container rises or falls it will exert a greater or less pressure on the gas trapped in the line. This pressure will be exerted on the diaphragm 18, and when the tank is full the pressure will cause the diaphragm to move from its extreme lower position as shown in Figure 3, to its extreme elevated position, and thereby carry along with it the cup 50, which will exert an upward pressure on the pin 54, rigidly secured to the lever 74. As the lever 74 moves upwardly the cam end 82 will press against the pin 102, and cause it to ride over the cam surface and thereby rotate the shaft 90 which will in turn communicate its motion to the pointer 92 to swing it over the dial 98 to register the liquid level in the liquid container. As the liquid in the container falls the pressure will diminish and the diaphragm 18 will reverse, causing it to more and more assume the position shown in Figure 3. As the diaphragm falls the lever 74 will fall therewith and due to the action of the hairspring 104, the pointer 92 will be swung in the opposite direction indicating a fall in the level of the liquid in the tank.

We claim:

1. In a gauge having a casing, a frame in the casing, a flexible lever mounted on said frame, a calibrating arm supported from said frame and contacting with said lever, said arm secured to said frame and extending substantially at right angles to said lever, an indicating means operated from said lever, and means for transmitting motion to said lever said motion being indicated by the indicating means.

2. In a gauge having a casing, a frame in the casing, a flexible lever supported from said frame, an angularly disposed edge portion on said lever, a calibrating arm supported from said frame and contacting with said lever, said arm having a curved or rounded portion contacting with said angular edge portion whereby a minimum surface or substantially point contact is secured, an indicating means operated from said lever, and means for transmitting motion to said lever said motion being indicated by the indicating means.

3. In a gauge having a casing, a supporting frame mounted therein, said frame having a plurality of fingers, a flexible lever secured to one of said fingers, indicating means mounted on other of said fingers, movable pressure responsive means secured to said frame, means for transmitting the motion of said pressure responsive means to said lever, said lever operating said indicating means whereby movement of the pressure responsive means will be indicated, and a calibrating arm secured to a finger of said frame and contacting with said lever.

4. In a gauge having a casing, a supporting frame mounted therein, said frame having a plurality of fingers, a lever secured to one of said fingers, indicating means rotatably mounted on other of said fingers comprising a pointer secured to a shaft pivoted between a pair of lugs on one of said fingers, a pin secured transversely of said shaft, and a spring to return said pointer to its zero position, movable pressure responsive means secured to said frame, and means for transmitting the motion of said pressure responsive means to said lever, said lever acting on said pin to operate said indicating means whereby the movement of the pressure means will be indicated.

5. In a gauge having a casing, a supporting frame mounted therein, said frame having a plurality of fingers, a lever secured to one of said fingers, a cam surface on the end on said lever, indicating means mounted on other of said fingers, said indicating means comprising a shaft pivoted at one of said fingers, a pointer on said shaft, a spring to return said pointer to zero position, and a pin mounted transversely of the shaft for engagement with said cam surface for causing movement of the lever to rotate the shaft, movable pressure responsive means secured to said frame, and means for transmitting the motion of said pressure means to said lever.

6. In a gauge having a casing, a supporting frame mounted therein, said supporting frame having a slot and a plurality of fingers, a lever secured to one of said fingers, indicating means mounted on other of said fingers, movable pressure responsive means, said pressure responsive means having a mounting frame secured in said slot, and means for transmitting the motion of said pressure responsive means to said lever, said lever being operatively connected with said indicating means whereby the movement of the pressure means will be indicated.

7. In a gauge, a casing, a supporting frame mounted in said casing, said frame having a slot, a diaphragm, a diaphragm frame having a portion received in said slot to removably mounted said diaphragm frame, a flexible lever secured to said supporting frame over said diaphragm, means connecting said diaphragm and lever to cause movements of the former to be communicated to the latter, and an indicating means operated by said lever.

8. In a gauge having a casing, an integral supporting frame mounted therein, said frame having a plurality of integral fingers formed at the edge thereof, a flexible lever secured to one of said fingers, indicating means mounted on other of said fingers, movable pressure responsive means secured to said frame, and means for transmitting the motion of said pressure responsive means to said lever, said lever operating said indicating means whereby the movement of the pressure responsive means will be indicated.

9. In a gauge having a casing and a supporting frame mounted therein, said frame having a slot, a cup-shaped member having an opening, means secured in said opening removably to mount said member in said slot, said means having a passage, a diaphragm mounted in said cup-shaped member and responsive to pressures transmitted through said passage, said frame having a plurality of fingers, a cam ended lever secured to one of said fingers and extending over said diaphragm, a connection between said diaphragm and lever whereby motion of the former is communicated to the latter, a calibrating arm secured to another of said fingers and extending over and contacting with said cam ended lever, indicating means comprising a shaft pivoted to ears on a third one of said fingers, said shaft having a pointer, a return spring and a transversely positioned pin secured thereto said pin contacting with said cam and operating said shaft through said cam end, and a loose and porous packing in the passage in said means to dampen sudden surges of pressure.

In testimony whereof we affix our signatures.

ELBRIDGE F. BACON.
CLARENCE B. DINSMORE.